United States Patent
Farrell et al.

(10) Patent No.: US 7,541,015 B2
(45) Date of Patent: Jun. 2, 2009

(54) PROCESS FOR PRODUCING A SILICON NITRIDE COMPOUND

(75) Inventors: Declan Farrell, Dun Laoghaire (IE); Santosh Y. Limaye, El Cajon, CA (US); Shanthi Subramanian, Skillman, NJ (US)

(73) Assignee: Vesta Research, Ltd. (IE)

( * ) Notice: Subject to any disclaimer, the term of this patent is extended or adjusted under 35 U.S.C. 154(b) by 0 days.

(21) Appl. No.: 12/094,991

(22) PCT Filed: Nov. 21, 2006

(86) PCT No.: PCT/US2006/045074

§ 371 (c)(1), (2), (4) Date: Sep. 30, 2008

(87) PCT Pub. No.: WO2007/062046

PCT Pub. Date: May 31, 2007

(65) Prior Publication Data

US 2009/0022647 A1    Jan. 22, 2009

Related U.S. Application Data

(60) Provisional application No. 60/739,825, filed on Nov. 25, 2005.

(51) Int. Cl.
C01B 21/068    (2006.01)
C01B 33/00     (2006.01)
C04B 35/00     (2006.01)

(52) U.S. Cl. .................. 423/344; 423/324; 501/97.1

(58) Field of Classification Search ............... 423/324, 423/344; 501/97.1
See application file for complete search history.

(56) References Cited

U.S. PATENT DOCUMENTS 3,257,167 A    6/1966    Mohr et al.

(Continued)

OTHER PUBLICATIONS

Johan Nijs and Vladimir P. Vasilevich, Final Report on the Project, Research, Technology and Feasibility Report on Production in the Republic of Belarus of Crystalline Silicon from the Re-use Raw Materials of Apatite Production to be Used in PV-Systems, "SfP-Crystalline-Silicone", NATO SfP-973936, Nov. 1, 1999-Mar. 31, 2003.

*Primary Examiner*—Jerry Lorengo
*Assistant Examiner*—Joseph V Micali
(74) *Attorney, Agent, or Firm*—Joy L. Bryant

(57) ABSTRACT

A process for producing a silicon nitride compound is presented. A starting solution comprising fluorosilicic acid is provided. The starting solution is derived from a silicon, etching process wherein silicon is etched with a solution comprising hydrofluoric acid and where silicon powder has been removed. The starting solution is heated to yield a vapor solution comprising silicon tetrafluoride, hydrogen fluoride, and water. The hydrogen fluoride is separated from the vapor solution wherein a pure stream of silicon tetrafluoride and water vapor remain. The silicon tetrafluoride and water vapor are hydrolyzed to yield a concentrated fluorosilicic acid solution. The fluorosilicic acid is reacted with a base to yield a fluorosilicic salt. The fluorosilicic salt is heated to yield anhydrous silicon tetrafluoride. The anhydrous silicon tetrafluoride is reacted with a metal hydride to yield a monosilane. The monosilane is reacted to form a silicon compound and a silicon nitride compound. The silicon and the silicon nitride compounds are recovered. In an alternate embodiment, the hydrogen fluoride is recovered from the reaction process and reintroduced into the porous silicon etching process.

13 Claims, 2 Drawing Sheets

U.S. PATENT DOCUMENTS

| | | |
|---|---|---|
| 4,062,930 A | 12/1977 | Zawadzki et al. |
| 4,122,155 A | 10/1978 | Prochazka et al. |
| 4,264,565 A | 4/1981 | Inoue et al. |
| 4,405,589 A | 9/1983 | Iwai et al. |
| 4,597,948 A | 7/1986 | Sanjurjo |
| 4,753,783 A | 6/1988 | Sanjurjo |
| 4,847,061 A | 7/1989 | Bossier, III et al. |
| 4,866,003 A | 9/1989 | Yokoi et al. |
| 4,900,530 A | 2/1990 | Anania et al. |
| 5,075,092 A | 12/1991 | Boone et al. |
| 5,178,847 A | 1/1993 | Judin et al. |
| 5,266,535 A | 11/1993 | Brink et al. |
| 5,378,666 A | 1/1995 | Bachelard et al. |
| 5,470,421 A | 11/1995 | Nakada et al. |
| 5,662,875 A | 9/1997 | Bachelard et al. |
| 5,876,685 A | 3/1999 | Krulik et al. |

PROCESS FOR PRODUCING A SILICON NITRIDE COMPOUND

CROSS-REFERENCE TO RELATED APPLICATIONS

This application claims the benefit of U.S. Provisional Patent Application Ser. No. 60/739,825, entitled, "Process for Producing a Silicon Nitride Compound," filed Nov. 25, 2005, which is hereby incorporated by reference in its entirety.

FIELD OF THE INVENTION

The present invention is related to the production of silicon nitride compounds. In particular, it relates to the production of a silicon nitride compound from silicon fluoride precursors formed as a by product from a silicon etching process.

BACKGROUND OF THE INVENTION

Silicon nitride based ceramics are considered useful for many applications, such as turbine engines, where it is desirable to achieve higher operating temperatures and efficiencies. Silicon nitride exhibits excellent high temperature properties such as high strength, creep and oxidation resistance and low thermal expansion. Several techniques are known for producing silicon nitride powder such as nitriding of silicon powder; chemical vapor deposition of silicon tetrachloride or chlorosilanes in the presence of ammonia or an $H_2$—$N_2$ mixture; carbothermic reduction of silicon oxide in the presence of nitrogen; and precipitation and thermal decomposition of silicon diimide. The properties of the products from these reactions are dependent on the synthetic route used to produce them. Factors such as metallic and nonmetallic impurity content, shape, morphology and crystallinity of the particles, as well as specific surface area are important in determining the sinterability of the particles, mechanical properties and oxidation resistance. In order to achieve the correct balance of properties, various routes have been explored to manufacture fine, high purity silicon nitride powders that result in increased cost and, in some instances, low yields of product. Therefore, one of the challenges in producing silicon nitride powders lies in finding a cost-effective manufacturing process for high purity, fine silicon nitride powders.

Prochazka et al. (U.S. Pat. No. 4,122,155) describe a method of producing ultrafine silicon nitride powder of high purity. The method employs a gas mixture of silane and ammonia which is heated at temperatures between about 600° C. and 1000° C. producing an amorphous powdery reaction product. The reaction product is heated at a calcination temperature of at least 1100° C. to yield ultrafine silicon nitride powder of high purity. In particular, it is emphasized that the reaction product as well as the silicon nitride powder resulting therefrom should be free of metallic impurities. The silane is of high purity, i.e., at least about 99.9% pure or higher and anhydrous ammonia is used. These requirements simply add to the cost of the manufacturing process.

Inoue et al. (U.S. Pat. No. 4,264,565) and Iwai et al. (U.S. Pat. No. 4,405,589) disclose a process for producing silicon nitride powders from silicon halide precursors by reacting the precursors with ammonia and, then, calcining the resultant reaction product at temperatures ranging from 1200° C.-1700° C., under an inert or reducing gas atmosphere. These processes are complex and have certain disadvantages. For example, the reaction of silicon halide and ammonia is highly exothermic requiring significant cooling to form the intermediate silicon diimide product. The process also requires washing with liquid ammonia to remove ammonium halide byproducts and may contain carbon impurities in the silicon nitride product. The process also requires a final crystallization step of the amorphous product obtained from imide decomposition.

Judin et al. (U.S. Pat. No. 5,178,847) disclose a process for the production of silicon nitride or silicon carbide ceramic whiskers and silicon nitride or silicon carbide ceramic powder from silicon fluoride and ammonia or a hydrocarbon at an elevated temperature. The hydrocarbon or ammonia is decomposed separately at a high temperature into reactive carbon or nitrogen and hydrogen, whereafter the carbon or nitrogen radical thus obtained is further in a gas phase contacted with reactive silicon formed therein from silicon difluoride, in order to deposit finely-divided silicon nitride or silicon carbide out from the gas phase. This process requires the use of a highly reactive difluoride product as the silicon carrier and as the silicon source in the synthesis reaction. The silicon difluoride is formed by reacting silicon tetrafluoride with silicon. The reaction product decomposes to form silicon tetrafluoride which is recycled. Therefore, the silicon tetrafluoride is not the source of the silicon nor is it truly consumed during the reaction process.

Bachelard et al. (U.S. Pat. No. 5,378,666) describe a process for producing whisker-free silicon nitride particulates by carbonitriding silicon dioxide. In particular, silicon nitride spheres, beads, or a variety of other shaped articles exhibiting a regular and controlled particle size, are produced by incorporating a primary reaction mixture of silica and carbon into a porous, carbon-based matrix material. The composite is carbonitrided and excess carbon is eliminated from the carbonitrided composite leaving behind silicon nitride. However, this process requires the addition of one or more carbon blacks and may require the addition of an initial or seed crystallization charge, such as a powder of silicon nitride.

Bachelard et al. (U.S. Pat. No. 5,662,875) describe a process for the manufacture of a fine powder of silicon nitride. The process comprises the reaction, in a nitrogen countercurrent and in continuous fashion, of silica, carbon and a seed crystal, in the presence of a volatile compound of a metal chosen from the group consisting of: Be, Mg, Ca, Sr, Ge, Sn, Ti, Hf, Na and Ba. The reaction zone possesses a temperature gradient, comprising a hot zone in which the metal compound passes into the gaseous state and a cold zone in which the metal compound in the gaseous state condenses. The metal compound in the gaseous state is carried from the hot zone to the cold zone by the nitrogen countercurrent. The metal is added to the reaction to control the particle morphology and size as well as aiding in the subsequent sintering of the powder. However, the addition of metals is undesirable because it causes degradation of the oxidation resistance and mechanical properties of the resulting silicon nitride particles.

Nakada et al. (U.S. Pat. No. 5,470,421) describe a method for purifying an etching solution consisting of an aqueous phosphoric acid solution which has been used in etching of a silicon nitride film. In the process, hydrogen fluoride is added to an etching solution consisting of an aqueous phosphoric acid solution which has been used for etching of a silicon nitride film. The resulting solution is heated to remove fluorides of silicon as reaction products of hydrogen fluoride with silicon compounds which have been contained in the etching solution together with vaporized water. When the silicon compounds as reaction products resulting from the etching precipitate to cause clogging of a filter, the precipitates are removed in the same manner as above. This process enables removal of silicon compounds as reaction products to prolong the life of the etching solution. This process emphasizes the recycling of a starting solution containing phosphoric acid, moreover, there is no mention of recovery of silicon nitride compounds.

An object of the present invention is to provide a process for producing silicon nitride from a starting solution containing fluorosilicic acid derived from a silicon etching process.

Another object of the invention is to recover the waste hydrofluoric acid from the process of the present invention for reuse in the process of the instant invention in addition to producing a silicon nitride compound.

SUMMARY OF THE INVENTION

By the present invention, a process for producing a silicon nitride compound is presented. A starting solution comprising fluorosilicic acid is provided. The starting solution is derived from a silicon etching process wherein silicon is etched with a solution comprising hydrofluoric acid and wherein silicon powder has been removed. The starting solution comprises fluorosilicic acid and is heated to yield a vapor solution comprising silicon tetrafluoride, hydrogen fluoride, and water. The hydrogen fluoride is separated from the vapor solution wherein a pure stream of silicon tetrafluoride and water vapor remain. The silicon tetrafluoride and water vapor are hydrolyzed to yield a concentrated fluorosilicic acid solution. The fluorosilicic acid is reacted with a base to yield a fluorosilicic salt. The fluorosilicic salt is heated to yield anhydrous silicon tetrafluoride. The anhydrous silicon tetrafluoride is reacted with a metal hydride to yield a monosilane. The monosilane is further reacted to either form a silicon nitride compound or a silicon compound that is either isolated or further reacted to form a silicon nitride compound. The silicon nitride compound is then recovered. In an alternate embodiment, the hydrogen fluoride is recovered from the reaction process and reintroduced into the silicon etching process.

Additional objects and advantages of the invention will be set forth in part in the description which follows, and in part, will be obvious from the description, or may be learned by practice of the invention.

BRIEF DESCRIPTION OF THE DRAWINGS

The accompanying drawings illustrate a complete embodiment of the invention according to the best modes so far devised for the practical application of the principals thereof, and in which.

DETAILED DESCRIPTION OF THE PREFERRED EMBODIMENTS

In order to fully understand the present invention, one needs to understand the silicon etching process. In the etching of silicon powders, typically an etching solution comprising $HF:HNO_3:H_2O$ at a 2:1:10 ratio is used to produce a porous silicon powder. The etchant is mixed with the silicon powder, allowed to react for a certain length of time, and a porous silicon powder is filtered from the solution. The remaining etchant solution typically contains fluorosilicic acid ($H_2SiF_6$) and may also contain hydrofluoric acid (HF), and nitric acid ($HNO_3$). At this point, the etchant solution is treated as waste using standard disposal methods. However, the process of the present invention eliminates the need for waste treatment of the etchant solution by converting it into several useful products (silicon nitride and silicon) and recovering and recycling hydrofluoric acid back into the etching process.

Figure 1:
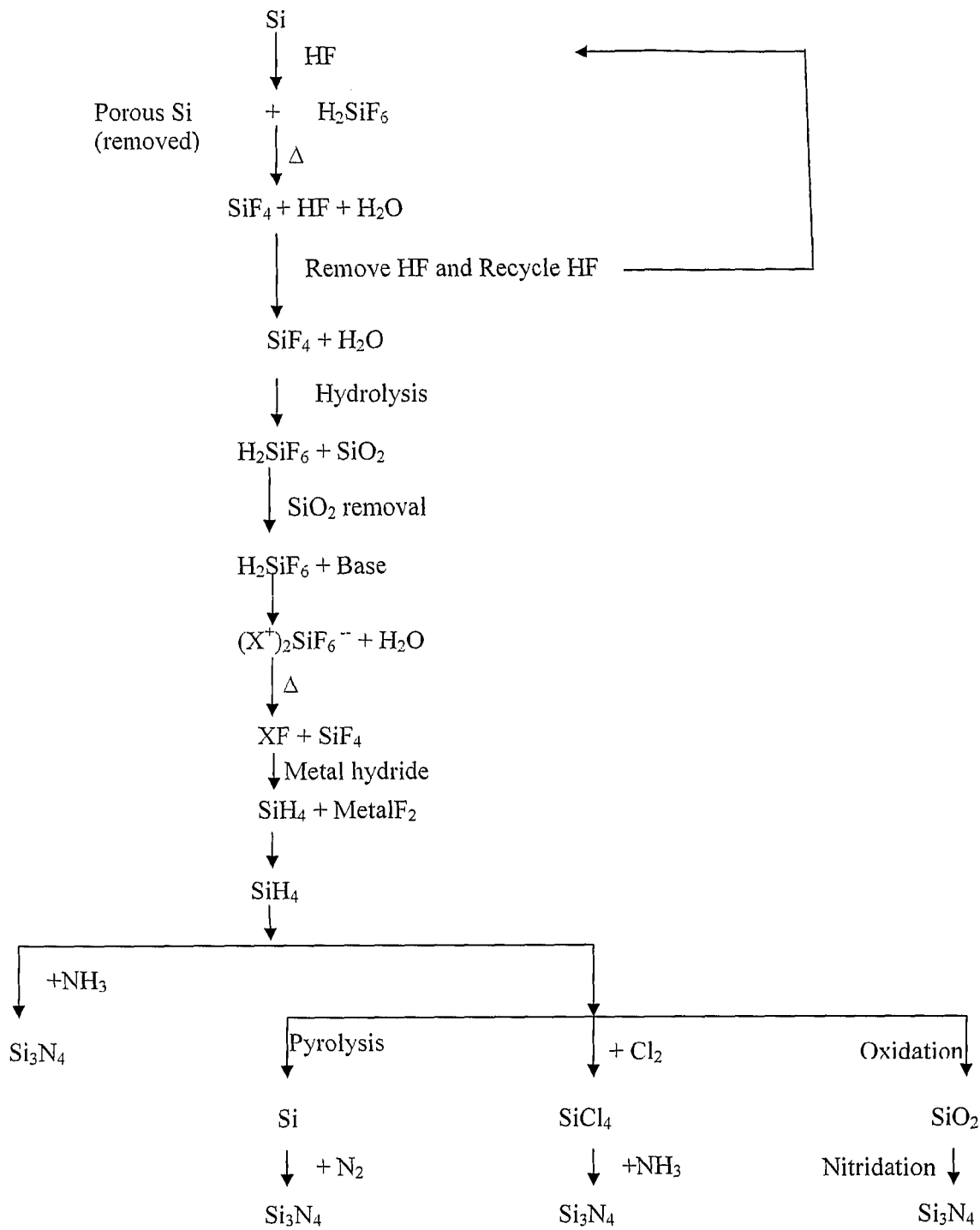
FIG. 1 is a flow chart depicting the process of the present invention.

Referring now to FIG. 1, which is a flow chart depicting the process of the present invention, one can gain a better understanding of the process of the present invention. Silicon (Si) powder is subjected to etching using an etching solution comprising hydrofluoric acid (HF). After a sufficient amount of time has passed to complete the etching process, the resulting porous silicon powder is removed from the solution leaving a "waste" etchant solution comprising fluorosilicic acid ($H_2SiF_6$). This etchant solution serves as a starting solution for the process of the present invention. It is understood that the "waste" etchant solution may contain other substances in addition to the fluorosilicic acid but, at a minimum, the etchant solution must contain fluorosilicic acid.

The starting solution is heated to yield a vapor solution comprising silicon tetrafluoride ($SiF_4$), hydrogen fluoride (HF), and water ($H_2O$). The hydrogen fluoride and any other impurities are separated and removed wherein a pure stream of silicon tetrafluoride and water vapor remain. Any separation technique known to one of ordinary skill in the art may be used. However, preferred separation techniques for separating the hydrogen fluoride from the silicon tetrafluoride and water vapor include but are not limited to: selective absorption, selective adsorption, use of a cryogenic trap, or distillation. The goal of the separation is to obtain a concentrated stream of silicon tetrafluoride and water vapor in the gaseous state. An alternative preferred embodiment involves the use of cryogenic traps. Cryogenic traps have been found to be useful for this separation because each gas is known to condense at a different temperature so traps can be made to specifically separate each gas. For example, silicon tetrafluoride sublimes at −86° C. and the boiling point of hydrogen fluoride is 19° C.

After separation, the hydrogen fluoride is recycled back into use in the silicon etching process.

Figure 2:
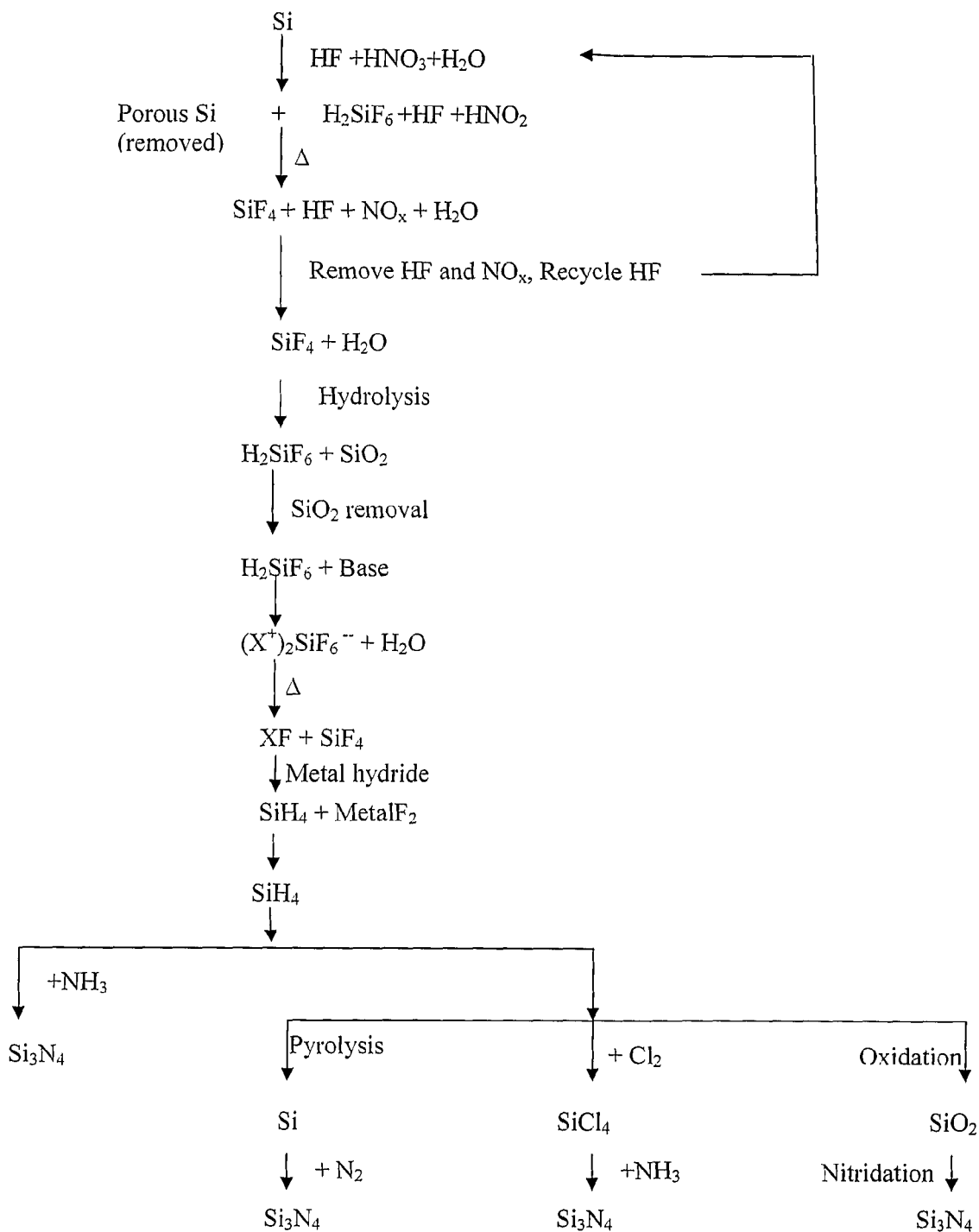
FIG. 2 is an alternative embodiment of the process of the present invention where the starting solution further comprises hydrofluoric acid and nitric acid.

FIG. 2 depicts an alternate embodiment of the invention where the etchant solution further comprises nitric acid and hydrofluoric acid. In this embodiment, silicon (Si) powder is subjected to etching using an 2:1:10 etching solution of $HF:HNO_3:H_2O$. After a sufficient amount of time has passed to complete the etching process, the resulting porous silicon powder is removed from the solution leaving a "waste" etchant solution comprising fluorosilicic acid ($H_2SiF_6$), hydrofluoric acid (HF), and nitric acid ($HNO_3$) remaining. This "waste" etchant solution serves as a starting solution for the process of the present invention.

The starting solution is heated to a temperature capable of yielding a vapor solution comprising silicon tetrafluoride ($SiF_4$), hydrogen fluoride (HF), nitrogen oxides ($NO_x$), and water. The hydrogen fluoride and nitrogen oxides are separated from the vapor solution wherein a pure stream of silicon tetrafluoride and water vapor remain. Any separation technique known to one of ordinary skill in the art may be used. However, preferred separation techniques for separating the hydrogen fluoride and nitrogen oxide from the silicon tetrafluoride and water vapor include but are not limited to: selective absorption, selective adsorption, use of a cryogenic trap, or distillation. The goal of the separation is to obtain a concentrated stream of silicon tetrafluoride and water vapor in the gaseous state. An alternative preferred embodiment involves the use of cryogenic traps. Cryogenic traps have been found to be useful for this separation because each gas is known to condense at a different temperature so traps can be made to specifically separate each gas. For example, silicon tetrafluoride sublimes at −86° C. and the boiling point of hydrogen fluoride is 19° C.

After separation, the hydrogen fluoride is recycled back into use in the silicon etching process.

Referring now to both FIG. 1 and FIG. 2, once the pure stream of silicon tetrafluoride and water vapor have been separated, it is hydrolyzed to yield a concentrated fluorosilicic acid solution. Any method of hydrolysis known to one of ordinary skill in the art may be used in the present invention. Silicon tetrafluoride can undergo controlled hydrolysis, thereby creating a concentrated solution of fluorosilicic acid as shown by the following equation:

$$3SiF_4 + 2H_2O \rightarrow H_2SiF_6 + SiO_2$$

After removal of the $SiO_2$ particles, the fluorosilicic acid ($H_2SiF_6$) is reacted with a base to yield a fluorosilicic salt. Any base known to one of ordinary skill in the art may be employed to form the salt. Particular bases include but are not limited to: NaOH, $Na_2CO_3$, KOH, and $NH_4OH$. An example of this reaction is shown by the following equation:

$$H_2SiF_6 + Na_2CO_3 \rightarrow Na_2SiF_6 + H_2O + CO_2$$

It should be noted here that excess base is not desirable, because the base may cause undesirable side reactions such as the one shown below.

$$Na_2SiF_6 + 2Na_2CO_3 \rightarrow 6NaF + SiO_2 + 2CO_2$$

The fluorosicilic salt is then heated to yield anhydrous silicon tetrafluoride. Thermal decomposition occurs to yield anhydrous silicon tetrafluoride. An example of this reaction is shown as:

$$Na_2SiF_6 \rightarrow 2NaF + SiF_4$$

It is necessary to go through the salt preparation route to obtain waterless (anhydrous) silicon tetrafluoride, since the distillation of the etchant results in a mixture of silicon tetrafluoride and water. Precipitation of a salt with poor solubility is the preferred route to obtain a pure stream of anhydrous silicon tetrafluoride.

The anhydrous silicon tetrafluoride is reacted with a metal hydride to yield a monosilane. Any metal hydride known to one of ordinary skill in the art may be used. Preferred metal hydrides include but are not limited to: calcium hydride, potassium hydride, lithium hydride, and sodium hydride. In this reaction, the silicon tetrafluoride is hydrogenated to yield a monosilane. An example of this reaction is shown below:

$$SiF_4 + 2CaH_2 \rightarrow SiH_4 + CaF_2$$

This reaction involves using calcium hydride in a salt melt, followed by adsorption refinement and micro filtration of the monosilane.

The monosilane is reacted to form a silicon nitride compound, which is then recovered. The monosilane undergoes various reactions to form the silicon nitride compound. In one embodiment of the invention, the monosilane is reacted with either ammonia or nitrogen gas to form a silicon nitride compound. Alternatively, a plasma assisted process is used to form a silicon nitride compound from the monosilane. In another embodiment of the invention, the monosilane is pyrolyzed to form silicon. The silicon is either isolated or nitrided to form a silicon nitride compound. This is shown as:

$$SiH_4 \xrightarrow{400° C.} Si + 2H_2$$

Alternatively, the monosilane is halogenated with a halogen selected from the group consisting of: chlorine ($Cl_2$), bromine ($Br_2$), and iodine ($I_2$) to form a halogenated silane which is then reacted with an amine to form a silicon nitride compound. In yet another embodiment, the monosilane is oxidized to form silicon dioxide and a carbothermal nitridation is used to form a silicon nitride compound.

The above description and drawings are only illustrative of preferred embodiments which achieve the objects, features and advantages of the present invention, and it is not intended that the present invention be limited thereto.

What is claimed is:

1. A process for producing a silicon nitride compound, the process comprising the steps of:
   a) providing a starting solution derived from a silicon etching process wherein silicon is etched with a solution comprising hydrofluoric acid and wherein silicon powder has been removed, the starting solution comprising fluorosilicic acid;
   b) heating the starting solution to yield a vapor solution comprising silicon tetrafluoride, hydrogen fluoride and water;
   c) separating the hydrogen fluoride from the vapor solution wherein a pure stream of silicon tetrafluoride and water vapor remain;
   d) hydrolyzing the silicon tetrafluoride and water vapor to yield a concentrated fluorosilicic acid solution;
   e) reacting the fluorosilicic acid with a base to yield a fluorosilicic salt;
   f) heating the fluorosilicic salt to yield anhydrous silicon tetrafluoride;
   g) reacting the anhydrous silicon tetrafluoride with a metal hydride to yield a monosilane;
   h) reacting the monosilane to form a silicon nitride compound; and
   i) recovering the silicon nitride compound.

2. A process according to claim 1, wherein the starting solution further comprises hydrofluoric acid and nitric acid.

3. A process according to claim 2, wherein the starting solution is heated to yield hydrogen fluoride and nitrogen oxide which are separated from silicon tetrafluoride by selective absorption, selective adsorption, a cryogenic trap, or distillation.

4. A process according to claim 3, wherein the hydrogen fluoride is separated from silicon tetrafluoride by selective absorption, selective adsorption, a cryogenic trap, or distillation.

5. A process according to claim 1, wherein fluorosilicic acid is reacted with a base selected from the group consisting of: NaOH, $Na_2CO_3$, KOH, and $NH_4OH$.

6. A process according to claim 1, wherein the metal hydride is selected from the group consisting of: calcium hydride, potassium hydride, lithium hydride, and sodium hydride.

7. A process according to claim 1, further comprising the step of reacting the monosilane with either ammonia or nitrogen to form a silicon nitride compound.

8. A process according to claim 1, further comprising the step of employing a plasma assisted process to form a silicon nitride compound from the monosilane.

9. A process according to claim 1, further comprising the step of pyrolyzing the monosilane to form silicon.

10. A process according to claim 9, wherein the silicon is nitrided to form a silicon nitride compound.

11. A process according to claim 1, further comprising the steps of halogenating the monosilane to form a halogenated silane and reacting the halogenated silane with an amine to form a silicon nitride compound.

12. A process according to claim 1, further comprising the steps of oxidizing the monosilane to form silicon dioxide and using carbothermal nitridation to form a silicon nitride compound.

13. A process according to claim 1, further comprising the steps of recovering the hydrogen fluoride and reintroducing the hydrogen fluoride into the porous silicon etching process.

* * * * *